Aug. 13, 1968   K. BURKHARD   3,397,331
ELECTRODE STRUCTURE FOR A MAGNETOHYDRODYNAMIC DEVICE
Filed July 20, 1965   2 Sheets-Sheet 1

KURT BURKHARD
*INVENTOR.*

BY Alden D. Redfield
M. E. Frederick
ATTORNEYS

KURT BURKHARD
INVENTOR

BY Alden D. Redfield
M. E. Frederick
ATTORNEYS 3,397,331
ELECTRODE STRUCTURE FOR A MAGNETO-
HYDRODYNAMIC DEVICE
Kurt Burkhard, Woburn, Mass., assignor to Avco Corporation, Cincinnati, Ohio, a corporation of Delaware
Filed July 20, 1965, Ser. No. 473,306
15 Claims. (Cl. 310—11)

The present invention relates generally to magnetohydrodynamic (hereinafter referred to as "MHD") devices employing a hot electrically conductive fluid or plasma, and more particularly to electrodes for use in such devices.

MHD generators produce electric power by movement of electrically conductive fluid or plasma relative to a magnetic field. The plasma employed is usually an electrically conductive gas from a high temperature, high pressure source. From the source, the plasma flows through the generator and by virtue of its movement relative to the magnetic field, induces an electromotive force between opposed electrodes within the generator. The gas comprising the plasma may exhaust to a sink which may simply be the atmosphere; or, in more sophisticated systems, the gas may exhaust to a recovery system including pumping means for returning the gas to the source. Conductivity of the gas may be produced thermally and/or by seeding with a substance that ionizes readily at the operating temperature of the generator. For seeding purposes, sodium, potassium, cesium or an alkali metal vapor may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

MHD pumps use the DC motor principle, i.e., a conductive fluid is considered to be a wire or conductor suspended in a magnetic field and has a current passed through it mutually perpendicular to the length of the conductor and the magnetic field. Under these conditions, a force is induced in the conductor which tends to move it in a direction which is mutually perpendicular to the current and magnetic flux. This force, when applied to a liquid conductor, propels the liquid conductor in the same manner as a conventional pump. Such pumps have become quite common in laboratory work and in connection with the movement of liquid sodium and liquid sodium-potassium in nuclear reactors. Electrodes for passing electric current through the liquid conductor within the magnetic field are located in what is generally referred to as the throat of the pump.

MHD accelerators are constructed and operate in substantially the same manner as MHD pumps, the difference being that whereas MHD pumps are generally used for pumping liquids, MHD accelerators are generally used for accelerating an electrically conductive gas.

For a more thorough discussion of MHD generators, reference is made to patent application Ser. No. 8,566, filed Feb. 15, 1960, and for a more thorough discussion of MHD electrodes, reference is made to patent application Ser. No. 280,273, filed May 14, 1963, and patent application Ser. No. 426,327, filed Jan. 18, 1965.

MHD generators have been proposed which use opposed pairs of segmented electrodes; that is, the electrodes are insulated from each other and individual loads are connected between electrodes of each pair. Another generator which utilizes the Hall effect to produce electric current has the load connected between electrodes at opposite ends of the flow path with pairs of intermediate electrodes being shorted together. In all of these MHD generators, it has been found that the current concentrates at one edge of the electrode. This, of course, causes a "hot spot" which tends to quickly destroy the electrode. Electrodes of the type disclosed in Patent No. 3,165,652 and the last two patent applications noted hereinabove for example have limited current carrying capacity, such as for example 10 amperes per square centimeter.

Electrodes suitable for use in an oxidizing environment and consisting of metal are unsatisfactory even for relatively small current densities because of their cooling effect on the boundary layer over the electrodes. Since all such metal electrodes must be maintained at relatively low temperatures as compared to that necessary to provide suitable electrical conductivities in the gas, the temperature of the boundary layer over this type of electrodes is relatively cold and consequently has a low conductance. This in turn results in concentrated arcs (hot spots) between the conductive part of the gas and the electrodes which quickly destroy the electrodes.

Because of their limited current carrying ability, zirconia electrodes as described in the aforementioned Patent No. 3,165,652 are not satisfactory for use where the electrode current density is in excess of about 10 amperes per square centimeter. This is due to the ohmic heating effect resulting from current flow within such electrodes which produces temperatures in excess of the melting temperatures of zirconia and/or conductors embedded therein.

From the above, it will now be seen that while reasonably satisfactory electrodes for MHD devices have been developed for low current density requirements, these electrodes will fail and, hence, are unsatisfactory where high current densities are required. Accordingly, it is a principal object of the present invention to provide an improved electrode structure for use in MHD devices.

Another object of the present invention is to provide a high temperature electrode structure for MHD devices which permits the use of high electrode current densities.

Another object of the present invention is to provide an electrode structure which permits high temperature boundary layers and thereby minimize the voltage drop at the electrodes and heat transfer to the electrodes.

A further object of the present invention is to provide an electrode with improved electrical characteristics which are not affected during use.

The various objects and advantages are realized by providing an electrode structure comprising a metal base member a portion of one end of which is covered with a metal the oxide of which is electrically conductive and which is exposed to the high temperature fluid of MHD devices and the remainder of which is covered by a refractory material. For purposes of this invention, metals such as platinum and iridium which have satisfactory electrical conductivities but which do not oxide to any appreciable extent are considered to be the same as metals the oxide of which is electrically conductive, such as for example silver. Examples of satisfactory refractory metals are alumina, beryllium oxide, and boron nitride and the like.

The novel features that are considered characteristic of the invention are set forth in the appended claims; the invention itself, however, both as to its organization and method of operation, together with additional objects and advantages thereof, will best be understood from the following description when read in conjunction with the accompanying drawings, in which:

Figure 1:
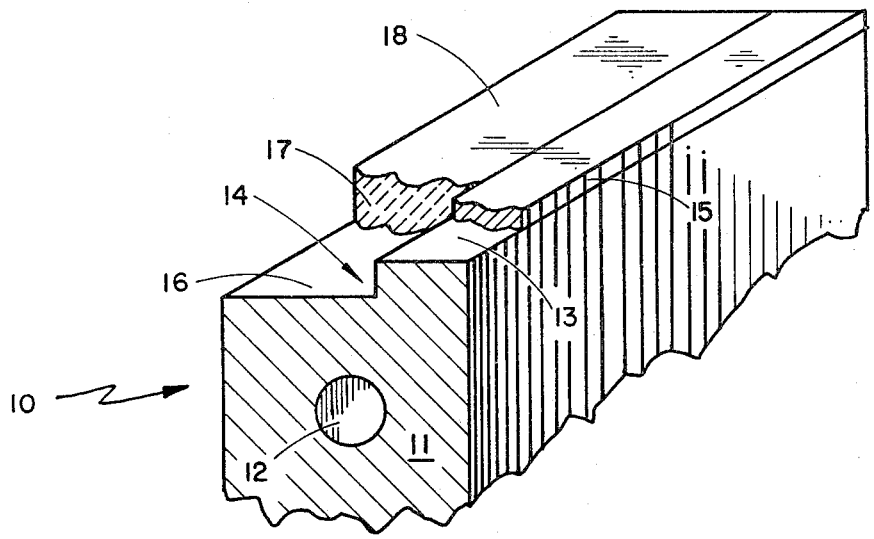
FIGURE 1 is a perspective view of an electrode constructed in accordance with the present invention.

In FIGURE 1 there is shown an electrode structure generally designated by the numeral 10 which comprises a metallic base member 11 of, for example, copper which is provided with a passage 12 for receiving a coolant. Since it will be necessary to cool the base member 11 in all practical situations requiring extended operating times, it may be comprised of any suitable metal having a low electrical resistance, such as copper.

A portion 13 of the end surface 14 of the base member to be disposed adjacent the high temperature fluid is covered and in an electrical contact with a metal 15 the oxide of which is electrically conductive such as, for example, silver or, alternately, a metal of the nonoxidizing type such as, for example, platinum or iridium. The critical requirement of the metal 15 exposed to the gas is that if it is oxidizable, the oxide be electrically conductive. Otherwise, longevity in combination with a high current carrying capacity (a current carrying capacity greater than that of zirconia electrodes and the like) will not be obtained. The thickness of the exposed metal need be only such as to provide reasonable electrode life since all such electrodes are subjected to a certain amount of erosive effects and the area of the exposed metal should be selected to carry the design current density of each electrode.

The balance 16 of the end surface 14 of the base member is covered with a refractory material 17 such as, for example, alumina, beryllium oxide, or boron nitride which is a good electrical and thermal insulator at the temperature of the electrically conductive fluid. The refractory material 17 should not carry any appreciable electrical current. This is necessary because the principal function of the refractory material is to heat or maintain the boundary layer over the electrodes at the highest possible temperature and not to carry current. If a refractory material capable of carrying appreciable electric current at the gas temperature is used such as, for example, zirconia, early failure or degradation of electrode performance can be expected at high electrode current densities due to ohmic heating in the refractory material. It is for just this reason that electrodes having an exposed layer of zirconia, which carry the total electrode current and are in contact with metal conductors (as taught in Patent No. 3,165,652), are not suitable for high electrode current densities. In this type of electrode, the current tends to concentrate at the junction of the zirconia and metal conductors and due to the resulting local ohmic heating at these locations produces temperatures within the electrode which exceed the melting point of the zirconia and/or metal conductors.

Accordingly, in accordance with the present invention, the thickness of the refractory material is selected to obtain the maximum safe temperature at the exposed surface 18 of the refractory material. Thus, if the temperature of the gas is less than the melting point or temperature at which the refractory material softens, the thickness of the refractory material (that dimension normal to the direction of gas flow) is selected to just provide in accordance with good design procedures, the maximum surface temperature. On the other hand, if the gas temperature is in excess of the melting temperature of the refractory material, the thickness is selected to provide a temperature at the exposed surface of the refractory material which is less than but not substantially less than the temperature at which the refractory material melts or substantially softens.

As will now be seen, it is the function of the refractory material to heat the boundary layer over the electrodes and it is the function of the exposed metal to carry the current. For extending operating times, appropriate cooling of the base member provides the necessary heat transfer to maintain the temperature of the various parts of the electrode within safe operating limits. Thus, the area of the refractory material and the surface temperature thereof can be easily selected to provide maximum temperature in the boundary layer over the metal exposed to the gas and thereby not only provide a minimum electrode drop at these points but prevent the occurrence of concentrated arcs or hot spots which erode and destroy the electrodes. The avoidance of metals, the oxide of which is not electrically conductive, permits further reduction of the electrode drop and the disposition of the refractory material between all points of the metal exposed to the gas on adjacent electrodes prevents or at least substantially reduces arc type breakdowns between adjacent electrodes. The provision of one sided grooves, which is to say grooves which extend to the edge of the base member, provide maximum spacing and, hence, minimum arcing between adjacent portions of the exposed metal on adjacent electrodes.

Figure 2:
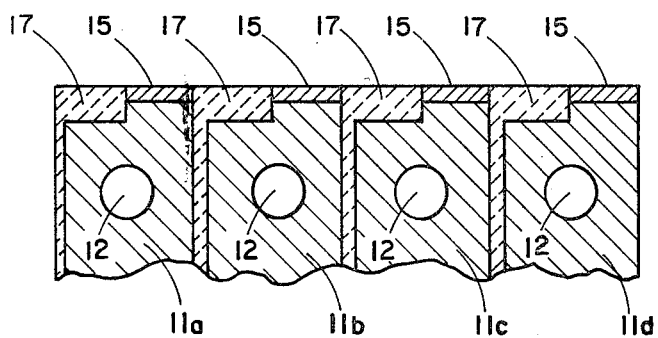
FIGURE 2 is a sectional end view of electrodes in accordance with the present invention.

FIGURE 2 illustrates a plurality of segmented electrodes 11a–11d in accordance with the present invention. As may be readily seen from FIGURE 2, the refractory material 17 not only covers a portion of the end of each electrode and is disposed between adjacent portions of the metal 15 exposed to the plasma or gas as shown in FIGURE 1, but also is disposed between each base member to electrically insulate them one from another.

Figure 3:
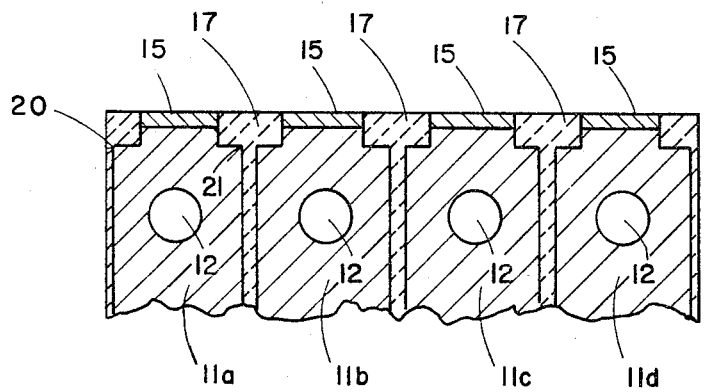
FIGURE 3 is a sectional end view of a modification.

FIGURE 3 illustrates a second embodiment wherein the portion of the end of each base members 11a–11d covered by the metal 15 exposed to the gas is intermediate its outer edges 20 and 21. This arrangement permits more uniform cooling of the metal exposed to the gas while providing the same spacing therebetween as shown in FIGURE 2.

Figure 4:
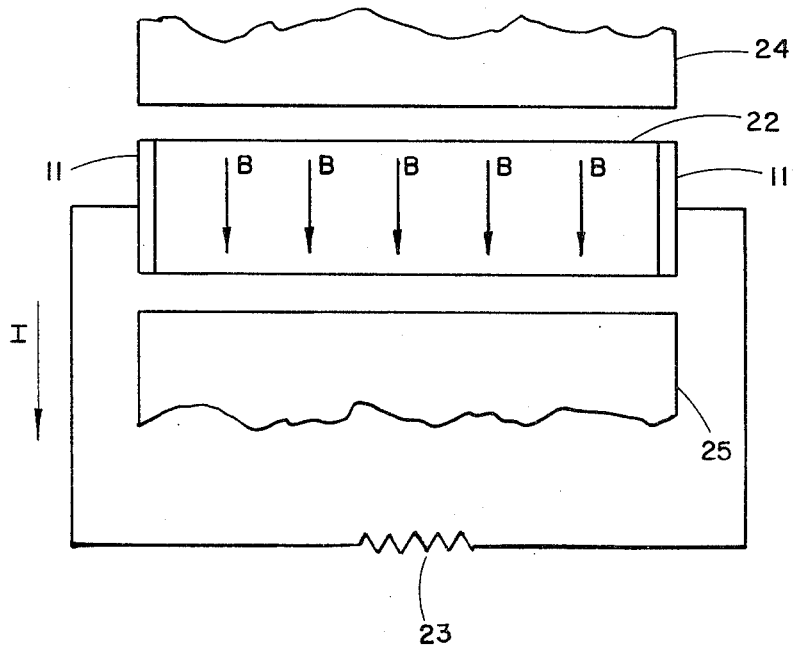
FIGURE 4 is a diagrammatic cross sectional view of a typical MHD generator.

FIGURE 4 illustrates a conventional MHD arrangement and shows an elongated rectangular fluid passage or duct 22 extending into the plane of the paper and electrodes 11 are disposed in the duct so that the surfaces of the refractory and metal exposed to the fluid are substantially parallel to the magnetic field and are connected to a load circuit which for simplicity of explanation and illustration is shown as a simple variable resistance 23. The duct is disposed between pole pieces 24 and 25 of a suitable magnet. If the direction of an ionized gas flow is into the plane of the paper and a magnetic field of constant flux density is applied at right angles to the direction of flow, as illustrated by the arrows labeled B, an EMF is generated in the conducting gas at right angles both to the field and to the direction of flow. This EMF acts on the free electrons and the ionized gas and causes an electron current to flow between the electrodes 11 and through the load 23 in the direction shown by the arrow I. If either the direction of gas flow or magnetic field is reversed, the current flow is in the opposite direction.

Representative temperatures of the exposed surface of the refractory material are 2000 to 2500° K. and depending on the type of metal used, representative temperatures of the metal exposed to the gas is 500 to 1000° K. Electrodes constructed in accordance with the present invention may be used as either anodes or cathodes for high electrode current densities, whereas for low electrode current densities, they are preferably used as anodes. It has been found in actual practice that at high electrode current densities, electrodes constructed in accordance with the present invention operate satisfactorily as cathodes. This is believed to be due to the fact that a large number of small cathode spots form at the surface of the exposed metal and that these cathode spots provide sufficient electron emission characteristics without appreciable erosion of the metal.

The various features and advantages of the invention are thought to be clear from the foregoing description. Various other features and advantages not specifically enumerated will undoubtedly occur to those versed in the

I claim:
1. An electrode for a magnetohydrodynamic device of the type in which the electrode is exposed to high temperature corrosive fluids comprising:
   (a) a metallic base member one end of which is adapted to be disposed adjacent said fluid;
   (b) a metal the oxide of which is electrically conductive exposed to said fluid and covering a portion of said end; and
   (c) a refractory material exposed to said fluid and covering substantially the remainder of said end.

2. An electrode for a magnetohydrodynamic device of the type in which the electrode is exposed to high temperature corrosive fluids comprising:
   (a) a metallic base member one end of which is adapted to be disposed adjacent said fluid;
   (b) a metal the oxide of which is electrically conductive exposed to said fluid and covering a portion of said end;
   (c) a refractory material exposed to said fluid and covering substantially the remainder of said end; and
   (d) means for maintaining said base member and said metal below the temperature at which they substantially soften.

3. An electrode for a magnetohydrodynamic device of the type in which the electrode is exposed to high temperature corrosive fluids comprising:
   (a) a metallic base member one end of which is adapted to be disposed adjacent said fluid, said base member having a passage adajacent said one end for receiving a coolant;
   (b) a metal the oxide of which is electrically conductive exposed to said fluid and covering a portion of said end; and
   (c) a refractory material exposed to said fluid and covering substantially the remainder of said end.

4. An electrode for a magnetohydrodynamic device of the type in which the electrode is exposed to high temperature corrosive fluid comprising:
   (a) a metallic base member one end of which adapted to be disposed adjacent said fluid;
   (b) a metal the oxide of which is electrically conductive exposed to said fluid and covering a portion of said end; and
   (c) a refractory material exposed to said fluid and covering substantially the remainder of said end, said refractory material being substantially electrically nonconductive at the temperature of said fluid and having a dimension perpendicular to the direction of fluid flow sufficient to maintain at least a portion of its said surface exposed to said fluid at a temperature substantially in excess of that of said second metal during operation of said magnetohydrodynamic device.

5. The combination as defined in claim 4 wherein said base member has a passage for receiving a coolant to maintain said base member and said metal below a temperature at which they substantially soften.

6. An electrode for a magnetohydrodynamic device of the type in which the electrode is exposed to high temperature corrosive fluids comprising:
   (a) a metallic base member one end of which is adapted to be disposed adjacent said fluid;
   (b) a metal the oxide of which is electrically conductive exposed to said fluid and covering an elongated portion of said end; and
   (c) a refractory material exposed to said fluid and covering the remainder of said end whereby said refractory material is disposed between an extreme outer edge of said end and said metal.

7. An electrode for a magnetohydrodynamic device of the type in which the electrode is exposed to high temperature corrosive fluids comprising:
   (a) a metallic base member one end of which is adapted to be disposed adjacent said fluid, said end having a first and second outer edge adapted to be disposed normal to the direction of flow of said fluid;
   (b) a metal the oxide of which is electrically conductive exposed to said fluid, said metal covering and being in electrical communication with a portion of said end; and
   (c) a refractory material exposed to said fluid and covering substantially the remainder of said end, said refractory material being disposed between said metal and at least one of said outer edges of said end.

8. An electrode for a magnetohydrodynamic device of the type in which the electrode is exposed to flowing, electrically conductive high temperature corrosive fluids comprising:
   (a) a metallic base member one end of which is adapted to be disposed adjacent said fluid, said end having a first and second outer edge adapted to be disposed normal to the direction of flow of said fluid;
   (b) a metal the oxide of which is electrically conductive exposed to said fluid, said metal covering and being in electrical communication with an elongated portion of said end; and
   (c) a refractory material exposed to said fluid and covering substantially the remainder of said end, said refractory material being disposed between said metal and at least one of said outer edges of said end, said refractory material having a dimension normal to the direction of flow of said fluid to maintain at least a substantial portion of its exposed surface at a temperature substantially in excess of that of said metal.

9. The combination as defined in claim 7 and including means for maintaining said metal at a temperature below that at which it substantially softens.

10. The combination as denfied in claim 9 wherein said base member is cylindrical and said end forms the inner periphery thereof.

11. The combination as defined in claim 9 wherein said base member is generally rectangular prismatic and the exposed surface of said metal and said refractory material are substantially flat and coplanar.

12. The combination as defined in claim 9 wherein said end of said base member is provided with a groove extending to at least one of said outer edges and said refractory material is disposed in said groove.

13. In a magnetohydrodynamic device including a conduit defining a flow path for a high temperature electrically conductive fluid and a magnetic field producing means providing a magnetic field extending transversely across said flow path,
   (a) a plurality of mutually insulated electrodes disposed on at least substantially one side of said flow path substantially parallel to said magentic field, each said electrode comprising a metal base member having an end surface adjacent said flow path;
   (b) a metal the oxide of which is electrically conductive exposed to said fluid and covering an elongated portion of each said end surface, said portion extending substantially transversely across said flow path; and
   (c) a refractory material exposed to said fluid and covering substantially the remainder of each said end surface, said refractory material being interposed between and separating said metal on adjacent base members.

14. In a magnetohydrodynamic device including a conduit defining a flow path for a high temperature electrically conductive fluid and a magentic field producing means providing a magnetic field extending transversely across said flow path,
  (a) a plurality of mutually insulated electrodes disposed on at least substantially one side of said flow path substantially parallel to said magnetic field, each said electrode comprising a metal base member having an end surface adjacent said flow path;
  (b) a metal the oxide of which is electrically conductive exposed to said fluid and covering an elongated portion of each said end surface, said portion extending substantially transversely across said flow path; and
  (c) a refractory material exposed to said fluid and covering substantially the remainder of each said end surface, said refractory material being interposed between and separating said metal on adjacent base members a distance sufficient to at least substantially prevent arcing therebetween, said refractory material having a dimension normal to said flow path sufficient to maintain a substantial portion of its exposed surface at a temperature substantially greater than that of said metal exposed to said fluid.

15. In a magnetohydrodynamic device including a conduit defining a flow path for a high temperature electrically conductive fluid and a magnetic field producing means providing a magnetic field extending transversely across said flow path,
  (a) a plurality of mutually insulated electrodes disposed on at least substantially one side of said flow path substantially parallel to said magnetic field, each said electrode comprising a metal base member having an end surface adjacent said flow path;
  (b) a metal the oxide of which is electrically conductive exposed to said fluid and covering an elongated portion of each said end surface, said portion extending substantially transversely across said flow path;
  (c) a refractory material electrically nonconductive at the temperature of said fluid exposed to said fluid and covering substantially the remainder of each said end surface, said refractory material being interposed between and separating said metal on adjacent base members a distance sufficient to at least substantially prevent arcing therebetween, said refractory material having a dimension normal to said flow path sufficient to maintain a substantial portion of its exposed surface at a temperature substantially greater than that of said metal exposed to said fluid; and
  (d) means for maintaining said metal exposed to said fluid at a temperature less than that at which it substantially softens.

References Cited
UNITED STATES PATENTS

| | | | |
|---|---|---|---|
| 3,149,253 | 9/1964 | Luebke | 310—11 |
| 3,165,652 | 1/1965 | Prater | 310—11 |
| 3,183,380 | 5/1965 | Hurwitz | 310—11 |

MILTON O. HIRSHFIELD, *Primary Examiner.*

D. X. SLINEY, *Assistant Examiner.*